Aug. 5, 1958 S. VAN MIERLO ET AL 2,846,513

CIRCUIT ARRANGEMENTS FOR TRANSMITTING SIGNALS SUCH AS RINGING SIGNALS TO SUBSCRIBERS TO AN AUTOMATIC TELEPHONE SYSTEM

Filed Sept. 4, 1953 3 Sheets-Sheet 1

Inventor
S. VAN MIERLO
C. WEILL
M.C.E. BATAILLE
By Robert Harding Jr.
Attorney

Aug. 5, 1958
S. VAN MIERLO ET AL
2,846,513
CIRCUIT ARRANGEMENTS FOR TRANSMITTING SIGNALS SUCH AS RINGING SIGNALS TO SUBSCRIBERS TO AN AUTOMATIC TELEPHONE SYSTEM
Filed Sept. 4, 1953
3 Sheets-Sheet 2

Inventor
S. VAN MIERLO
C. WEILL
M.C.E. BATAILLE
By Robert Harding Jr.
Attorney

Inventor
S. VAN MIERLO
C. WEILL
M.C.E. BATAILLE
By Robert Harding Jr.
Attorney

United States Patent Office 2,846,513

Patented Aug. 5, 1958

2,846,513

CIRCUIT ARRANGEMENTS FOR TRANSMITTING SIGNALS SUCH AS RINGING SIGNALS TO SUBSCRIBERS TO AN AUTOMATIC TELEPHONE SYSTEM

Stanislas Van Mierlo, Camille Weill, and Maurice Camille Eugène Bataille, Paris, France, assignors to International Standard Electric Corporation, New York, N. Y., a corporation of Delaware Application September 4, 1953, Serial No. 378,448

Claims priority, application France September 5, 1952

2 Claims. (Cl. 179—84)

The present invention relates to circuit arrangements for transmitting signals and more particularly circuit arrangements for transmitting ringing signals to subscribers' substation of an automatic telephone system.

In automatic telephone systems used up to date and in automatic telephone systems utilizing electronic switching devices, expensive equipments necessitating, for example, an amplifying element, such as a gas triode or a thyratron, for each subscriber's line circuit have been used for the transmission of the ringing signal to the called substation.

According to one of the features of the invention, a circuit arrangement for transmitting a ringing signal to the substations of an automatic telephone system comprises in combination; means for producing a ringing signal of suitable amplitude and frequency, means such as a distributing circuit, for applying successively and during predetermined time intervals the said ringing current to a plurality of output terminals, switching means common to a plurality of subscribers' lines adapted for applying simultaneously the ringing currents obtained to a plurality of output terminals of the said distributing circuit respectively to an equal number of called lines.

According to another feature of the invention, in such an arrangement, the switching means are constituted by a switch of the type known as "cross-bar," the switching horizontal multiples of which are connected to different output terminals of the distributor and the vertical multiples of which are connected to various subscribers' lines.

According to another feature of the invention, each subscriber's line of a group of a hundred lines is connected to two output terminals of a cross-bar switch by means of a potential coincidence detection electronic gate having two input terminals connected respectively to two output terminals of the switch and an output terminal connected to the corresponding line, the said electronic gate being provided in such a way as not to permit the passage of ringing current towards the line except when the said ringing current is simultaneously applied to its input terminals from the said switch.

According to another feature of the invention, in such an arrangement, the vertical multiples of the switch are divided into two groups, one of the groups corresponding to the units digit of the group of subscribers' lines and the other group corresponding to the tens digit, the input terminals of the electronic gates associated with the subscriber's lines being connected respectively to an output terminal of each group, means being besides also provided for connecting the two vertical multiples corresponding to a called subscriber of the same horizontal multiple.

One of the objects of the present invention is to provide a simple and economical circuit arrangement for transmitting ringing signals to the subscribers to an automatic telephone system.

Another object of the present invention is to provide a circuit arrangement for transmitting ringing signals to an automatic telephone system's subscribers comprising reduced number of elements individual to each line.

Other objects, features and advantages of the present invention will appear from a reading of the following description of embodiments, the said description being given in conjunction with the accompanying drawings in which.

Figure 1:
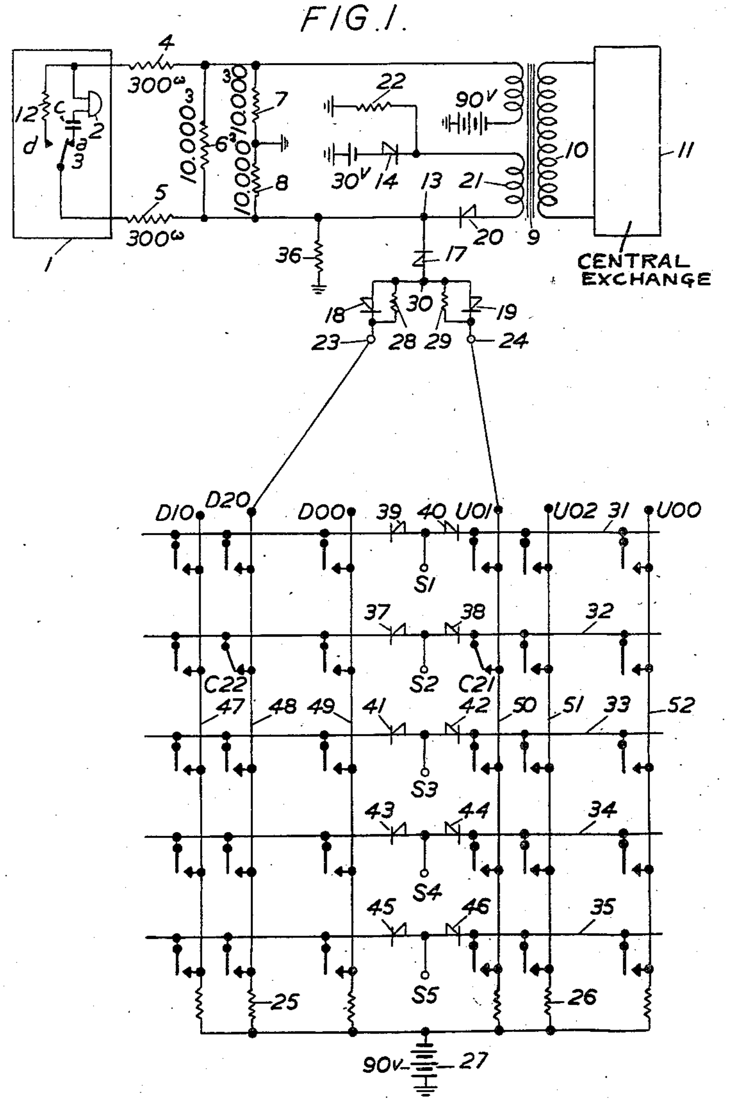
Fig. 1 shows an embodiment of a device for distributing ringing signals incorporating features of the present invention.

There is shown in Fig. 1 a line circuit for an automatic telephone system using switching electronic devices. The subscriber's station has been shown schematically by a rectangle 1 and only the ringing device 2 and the switch hook 3 have been shown. The resistances 4 and 5 represent the line resistance and the resistances 6, 7 and 8 represent the leaks which may take place in an underground cable. The values which are indicated for the line resistance are average values and the values which are indicated for the leaks represent very unfavourable conditions which may take place in the case of an underground cable. The line circuit represented comprises a transformer 9 which is necessary for reasons independent of the present invention, such as the separation of the direct current circuits or the impedance matching. The secondary winding 10 of the transformer 9 is connected within the central exchange which has been shown schematically by means of the rectangle 11. There is shown in 12 at the subscriber's station, a resistance which represents the impedance of the telephone set. When the line is not looped, that is to say when the switch hook 3 is in position *a*, the diode 14 is blocked and the potential of point 13 is near to the potential of the ground: when the subscriber lifts his telephone set, the potential of point 13 passes to −40 volts. This potential variation during the unhooking of the telephone set may also be used for detecting calls, as this is well known in the art.

Figure 2:
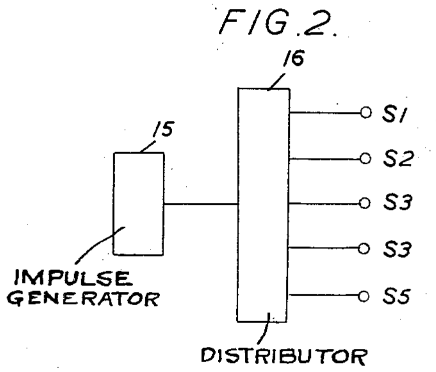
Fig. 2 shows a generator of ringing current used in connection with Fig. 1.

The ringing current generator is represented schematically in Fig. 2. It comprises an impulse generator 15 which supplies rectangular impulses at 20 periods per second. The amplitude of these impulses varies between −90 volts to +150 volts. The output impulses of generator 15 are applied to a distributor 16 which applies the input impulses successively, during 0.8 second, to the five output terminals S1, S2, S3, S4 and S5, the distribution cycle thus taking place during four seconds. Such a distributor may be realized either by means of an electronic distributor or by a mechanical device comprising, for instance, contacts controlled by cams carried by a shaft driven into rotation by means of a motor.

Each line circuit (Fig. 1) is associated, from the point of view of the ringing current transmission, with an electronic gate comprising three diodes 17, 18, 19 which may for example be selenium diodes. A diode 20 is also provided for avoiding the leaks through the primary winding 21 of the transformer and the resistance 22. The points 23 and 24 are connected permanently through resistances, such as 25 and 26 of the order of 2,000 ohms, to the negative terminal of a battery 27 of 90 volts. If there is applied to one of the points 23 or 24 (point 23 for instance), the impulses obtained at one of the output terminals of the distributor 16 (Fig. 2), whereby point 23 is brought to +150 volts, the current flows in the following circuit: resistance 28 in parallel with the diode 18, presenting a high resistance, resistance 29 in parallel with the diode 19, presenting a low resistance, resistance 26, negative terminal of the 90 volts battery. By a suitable choice of the values of the resistances, one may arrange so that, under these circumstances, the potential of point 30 is lower than the potential of point 13 when the line is free (unhooked condition), so that the diode 17 presents a high resistance and the impulses obtained at the output terminal of the distributor 16 do not reach the line. If one applies the impulses obtained at one of the output terminals of the distributor 16 simultaneously to points 23 and 24, assuming a suitable choice of the value of resistances 28, 29 and 36, there is obtained at point 30 a potential near 60 volts when the points 23 and 24 are brought to +150 volts. The diode 17 then presents a low resistance, and there are obtained on the line at point 13 impulses of the order of 60 volts, according to the rhythm of the distributor 16. In a particular embodiment the resistance 36 has a value of 6,000 ohms and the resistances 28 and 29 have each a value of 12,000 ohms.

The device used for applying the impulses obtained at one of the output terminals of the distributor 16 (Fig. 2) to one of the lines will now be described.

Use is made for this purpose of a switch of the crossbar type which has been shown schematically in Fig. 1. However, there have not been shown in this figure the blocking devices which are also well known in the art, nor the controlling electro-magnets of the horizontal and vertical bars. The switch used comprises five horizontal bars and two groups of ten vertical bars. The five horizontal bars correspond respectively to the five output terminals S1, S2, S3, S4, S5 of the distributor 16 (Fig. 2). The horizontal multiples are shown in Fig. 1 at 31, 32, 33, 34 and 35. Each multiple, such as 32, comprises two diodes, such as 37 and 38, connected to an output terminal, such as S2, of the distributor 16 (Fig. 2). The common points of the diodes 39—40, 41—42, 43—44 and 45—46 are likewise connected respectively to the output terminals S1, S3, S4 and S5 of the distributor 16 (Fig. 2). The pairs of diodes divide the horizontal multiple into two parts, which are respectively controlled by ten vertical bars. The vertical multiples corresponding to the tens, 10, 20 and 00 are shown at 47, 48, and 49, and the vertical multiples corresponding to the units, 1, 2 and 0 are shown at 50, 51, and 52. It is assumed that the subscriber whose line circuit is shown in Fig. 1 is the subscriber 21 and that the necessary ringing current is obtained as from the terminal S2 of the distributor 16. The points 23 and 24 of the line circuit are respectively connected to the output terminals D20 and U01 of the switch. For applying the ringing current to this line, the horizontal and vertical bars are operated in a well known manner to close contacts *c*2.2 and *c*2.1 which remain closed under the control of the controlling electro-magnet of the corresponding horizontal bar. The impulses obtained at the output terminal S2 of the distributor 16 are therefore applied simultaneously to the terminals 23 and 24, so that, as explained above, the ringing current is transmitted on the line towards the called substation.

The ringing current has been transmitted, in the case considered, as from the output terminal S2 of the distributor 16 (Fig. 2), but it is obvious that it would have been possible to transmit the ringing current from another output terminal of the distributor, whilst causing the operation of another horizontal bar of the switch. It is understood that the device shown is common to a group of 100 circuits of subscribers' lines, each line circuit having two terminals, such as 23 and 24, which are connected respectively to the output terminals of the switch corresponding to the tens digit and to the units digit of the line number. The device shown in Fig. 1 permits the transmission of the ringing current simultaneously to five subscribers' lines; however, it is obvious that, if the traffic conditions would necessitate it, one could use a switch comprising a greater number of horizontal circuits associated with one or several distributors comprising on the whole an equal number of output terminals. As may be noted, the lines to which the ringing current is applied receive the current successively. Which of the output terminals of the distributor 16 (Fig. 2) is used to transmit the ringing current to a subscriber is obviously immaterial; however, it is necessary to provide means for choosing a free output terminal of the distributor and lock and maintain the corresponding horizontal bar.

Figure 3:
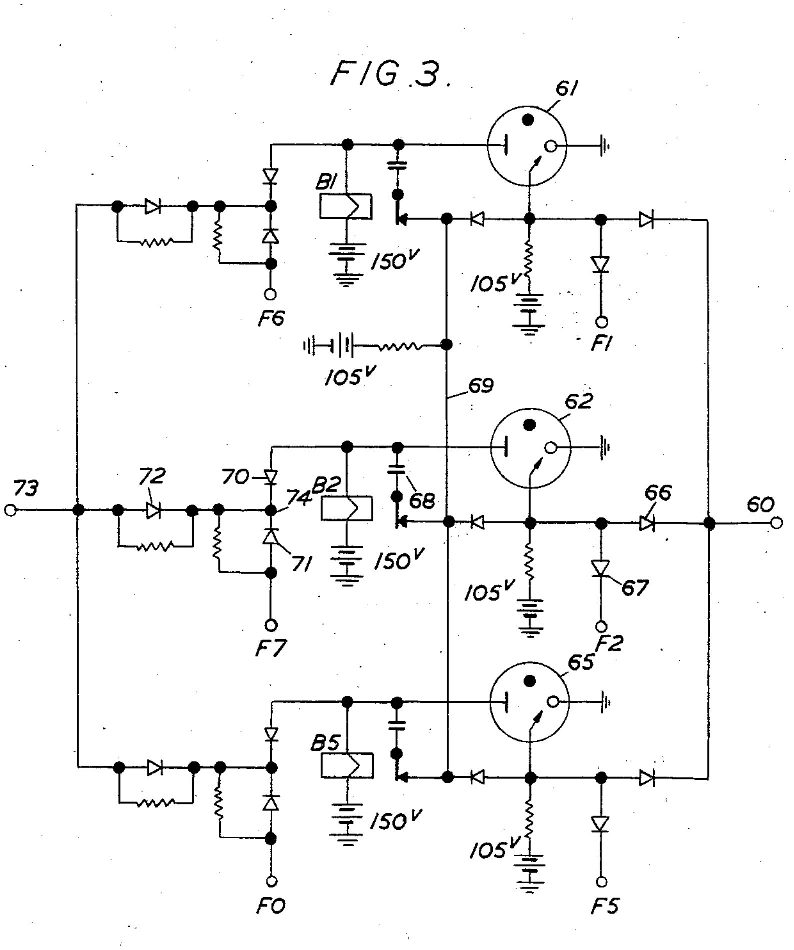
Fig. 3 represents controlling circuits for the device which transmits ringing current shown in Fig. 1.

There is shown in Fig. 3 an embodiment of a control circuit of the electro-magnets of the horizontal bar of the switch. Only the circuits corresponding to three of the electro-magnets have been shown, that is, the electro-magnets B1, B2, B5 corresponding to the horizontal bars 1, 2 and 5. The recurrent impulses F1, F2, F3, F4 and F5 (Fig. 4) are applied to the corresponding terminals of Fig. 3 which have been designated by the same references. Likewise, the recurrent impulses F6, F7, F8, F9 and F0 are applied to the corresponding terminals of Fig. 3. The impulses F1—F5 have each a duration of one millisecond and their amplitude passes from +50 volts to +105 volts. They normally have no influence on the cold cathode tubes 61—65, in view of the fact that the terminal 60 is normally brought to +50 volts, as is shown at 60 in Fig. 4. When it is desired to light one of the cold cathode tubes and to feed the electro-magnet connected in its anode circuit, an impulse of 105 volts of a duration of 6 milliseconds is applied to the terminal 60, which period of time is slightly greater than the duration of the scanning cycle of the five cold cathode tubes. During the time of this impulse, the first impulse, F1, F2, F3, F4, F5, applied to an extinguished cold cathode tube, causes the lighting of this tube. It will be assumed, for example, that the terminals 60 and F2 are simultaneously brought to 105 volts. The diode 66 is then blocked and the impulse applied to F2 will cause the unblocking electrode of the tube 62 to become positive and light this tube. The relay B2 then operates in the anode circuit of the tube 62. As soon as the tube 62 lights up, its anode potential falls near 100 volts. As the electro-magnet B2 does not open its back contact immediately, this drop of potential is transmitted through the condenser 68 to the blocking line 69, so that the triggering electrodes of the other tubes are brought to a potential sufficiently low for avoiding the lighting up of these tubes. The time during which this potential is applied must be at the minimum equal to the duration of the lighting impulse.

Figure 4:
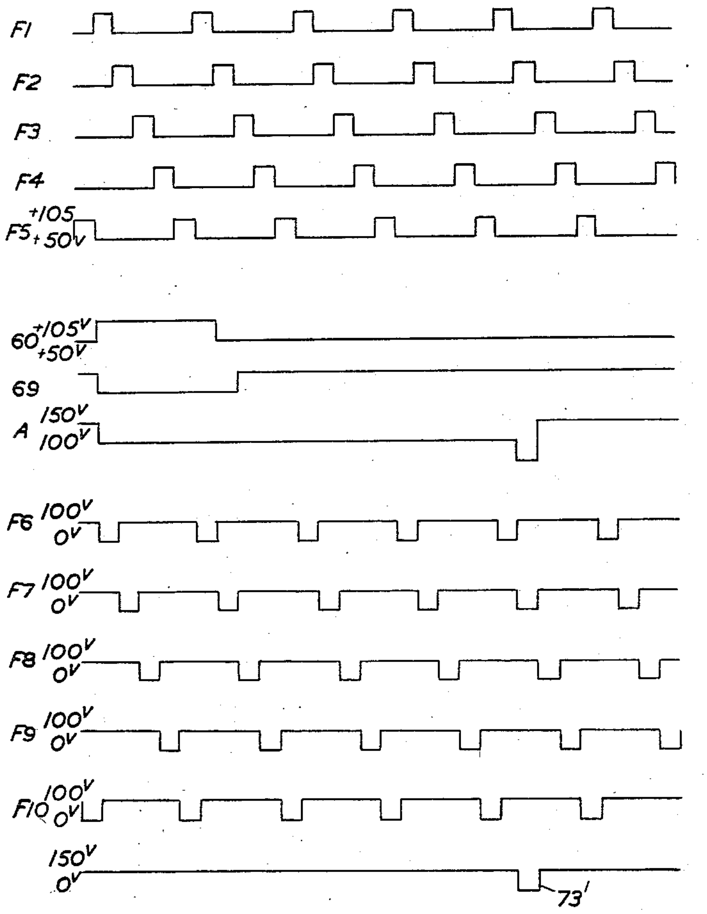
Fig. 4 represents wave shapes in different points of the circuit of Fig. 3.

In Fig. 4, the potential of the blocking line is shown at 69, and it has been assumed that this blocking potential was to be applied during 7 milliseconds, thus conditioning the operation of the electro-magnets. When the electro-magnet is actuated, it remains at work during the application of the ringing current to the subscriber's line. In order to cause the unblocking, it is necessary to cause the extinction of the tube that is lit by means of extinction circuits associated with the tubes, which circuits have been represented on the left hand side of Fig. 3. Each circuit comprises three diodes 70, 71, 72 connected in order to constitute an electronic gate. Recurrent impulses, as represented in Fig. 4, are applied to the terminals F6, F7, F8, F9, F0. The control terminal 73 is normally brought to +150 volts, so that the negative impulses applied, for example, to the terminal F7 are without any effect on the anode of the tube 62, the potential of point 74 remaining near 150 volts. If there is applied a negative impulse, such as that shown at 73' (Fig. 4), at the terminal 73, the diode 72 is blocked and the point F7 is then brought to a potential near 0 volts. Under these conditions, the diode 70 presents a low resistance and the potential of the anode, shown at A (Fig. 4) falls at a value near 50 volts, so that the tube is extinguished. It is understood that for extinguishing a tube it is sufficient to apply to the terminal 73 a negative impulse of suitable amplitude and duration in coincidence with the impulse applied to that of the terminals F6 to F0 which corresponds to this tube. The controlling of the electro-magnets of the vertical bars may be made from the number of the subscriber to whom the ringing current must be transmitted, which number is recorded in the common control circuit. Likewise, the choice of the horizontal bar which is to be released is made from the said common control circuit. Common control circuits which may be used with the circuit of the present invention have already been described and their adaptation to the circuit described is well known to those skilled in the art.

While the principles of the invention have been described above in connection with specific embodiments and particular modifications thereof, it is to be clearly understood that this description is made only by way of example and not as a limitation on the scope of the invention.

What is claimed is:

1. A circuit arrangement for transmitting a ringing signal to the subscribers' lines of an automatic telephone exchange system comprising a plurality of lines, a predetermined lesser number of terminals, means for producing a ringing signal of suitable amplitude and frequency, distributing means for applying said ringing signal successively during predetermined time intervals to said terminals, switching means common to said plurality of lines adapted for connecting any number of said terminals to a corresponding number of said lines during the same period, said switching means comprising a crossbar switch, the switching horizontal multiples of which are connected respectively to said terminals and the vertical multiples of which are connected respectively to said lines, the vertical multiples of said switch being divided into two groups, one of the groups corresponding respectively to the units digits of said lines and the other group corresponding respectively to the tens digits, and an electronic coincidence gating circuit for each line connected between said line and said switching means, said gating circuit having two input circuits connected respectively to vertical multiples of said two groups and adapted to operate to pass the ringing signal to the associated line only when said ringing signal appears on both input circuits, said switch being adapted to connect the two vertical multiples corresponding to a called line to the same horizontal multiple.

2. A circuit arrangement for transmitting a ringing signal to the subscribers' lines of an automatic telephone exchange system comprising a plurality of lines, a predetermined lesser number of terminals, means for producing a ringing signal of suitable amplitude and frequency, distributing means for applying said ringing signal successively during predetermined time intervals to said terminals, switching means common to said plurality of lines adapted for connecting any number of said terminals to a corresponding number of said lines during the same time period, a gating circuit connected between each said line and said switching means, said gating circuit having two input circuits connected to said switching means and adapted to operate to pass the ringing signal only when said signal is applied to both said input circuits, said switching means having two groups of additional terminals, one group corresponding respectively to the tens digits of said lines and the other group corresponding respectively to the units digits of said lines, the input circuits of each gating circuit being connected to the corresponding tens and units additional terminals of said two groups, and means in said switching means for connecting an output terminal carrying the ringing signal to a pair of said additional terminals, one from each group, corresponding to a called line.

References Cited in the file of this patent

UNITED STATES PATENTS

| | | |
|---|---|---|
| 2,535,675 | Goddard | Dec. 26, 1950 |
| 2,714,632 | Hall | Aug. 2, 1955 |